United States Patent [19]

Bennett

[11] Patent Number: 4,474,344
[45] Date of Patent: Oct. 2, 1984

[54] COMPRESSION-SEALED NACELLE INLET DOOR ASSEMBLY

[75] Inventor: Charles O. Bennett, Tacoma, Wash.

[73] Assignee: The Boeing Company, Seattle, Wash.

[21] Appl. No.: 247,470

[22] Filed: Mar. 25, 1981

[51] Int. Cl.³ .............................................. B64D 33/02
[52] U.S. Cl. .................... 244/53 B; 49/368; 49/485; 137/15.1
[58] Field of Search .............. 244/53 B, 110 B, 129.4, 244/129.5; 137/15.1, 15.2; 60/226 A; 49/368, 473, 485, 488

[56] References Cited

U.S. PATENT DOCUMENTS

| 2,604,278 | 7/1952 | Johnson | 244/53 B |
| 3,077,735 | 2/1963 | Johnson et al. | 137/15.1 |
| 3,915,413 | 10/1975 | Sargisson | 244/53 B |
| 4,132,068 | 1/1979 | Johnston | 60/226 A |
| 4,206,893 | 6/1980 | Howard | 244/110 B |

FOREIGN PATENT DOCUMENTS

| 1181063 | 11/1964 | Fed. Rep. of Germany | 244/53 B |
| 315650 | 11/1971 | U.S.S.R. | 244/53 B |

Primary Examiner—Charles E. Frankfort
Attorney, Agent, or Firm—R. E. Suter; B. A. Donahue; R. M. Heald

[57] ABSTRACT

A compression-sealed door assembly for use in controlling air flow pressure levels within a supersonic jet nacelle inlet, wherein substantially U-shaped strips of resiliently compressible material is compressed between a door and the nacelle inlet to seal air flow passageways through the inlet when the door assembly is pivoted to its fully closed position.

11 Claims, 13 Drawing Figures

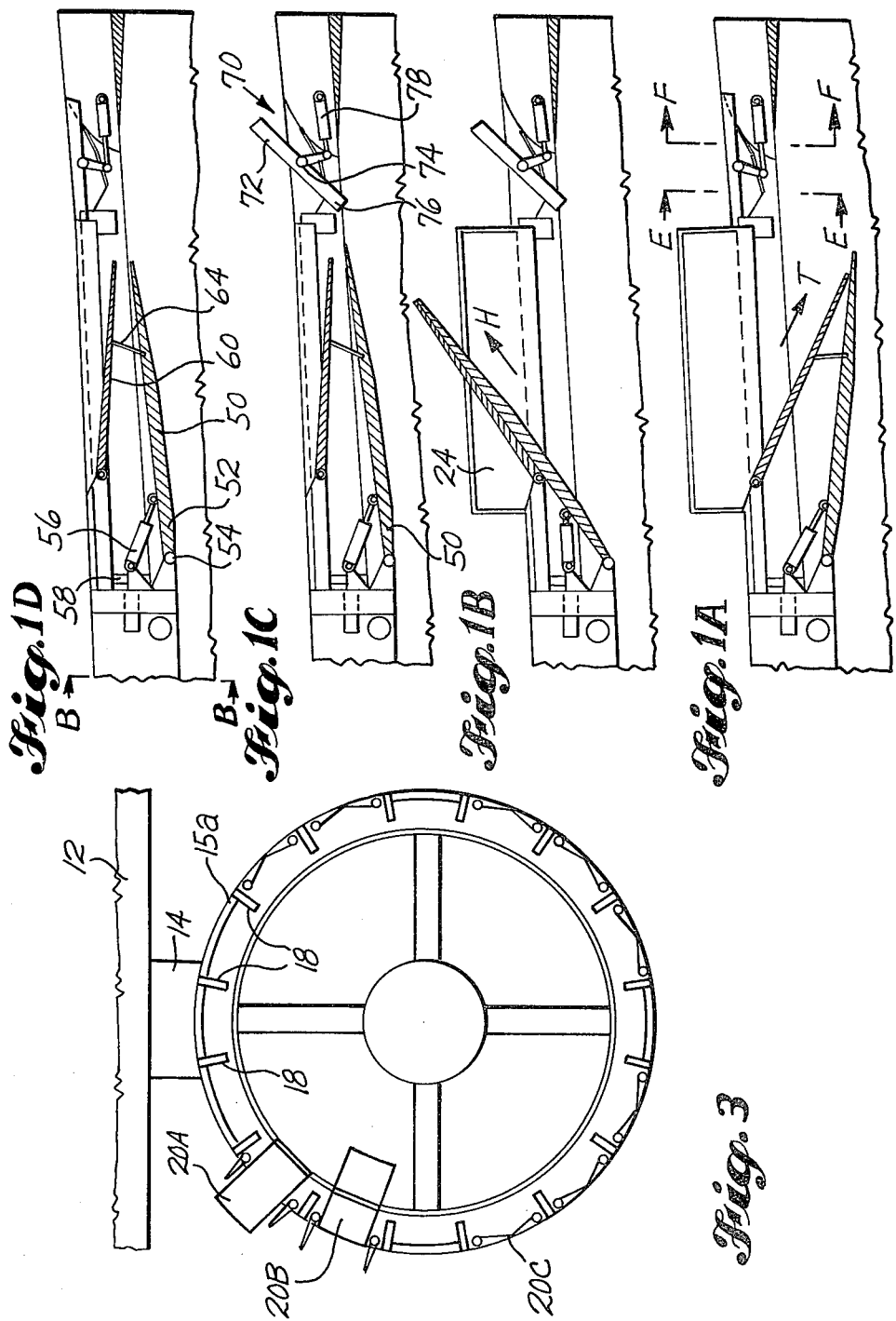

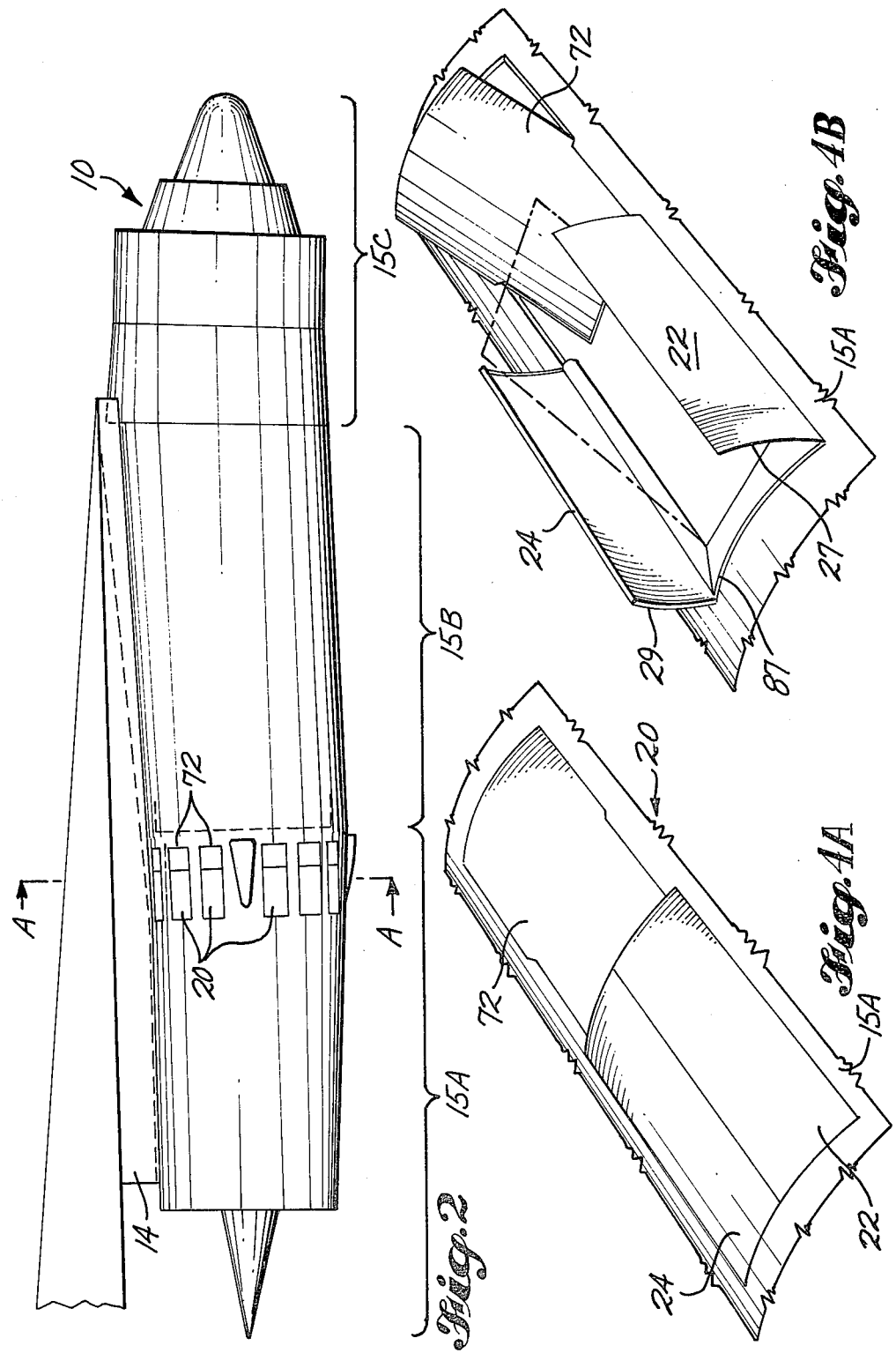

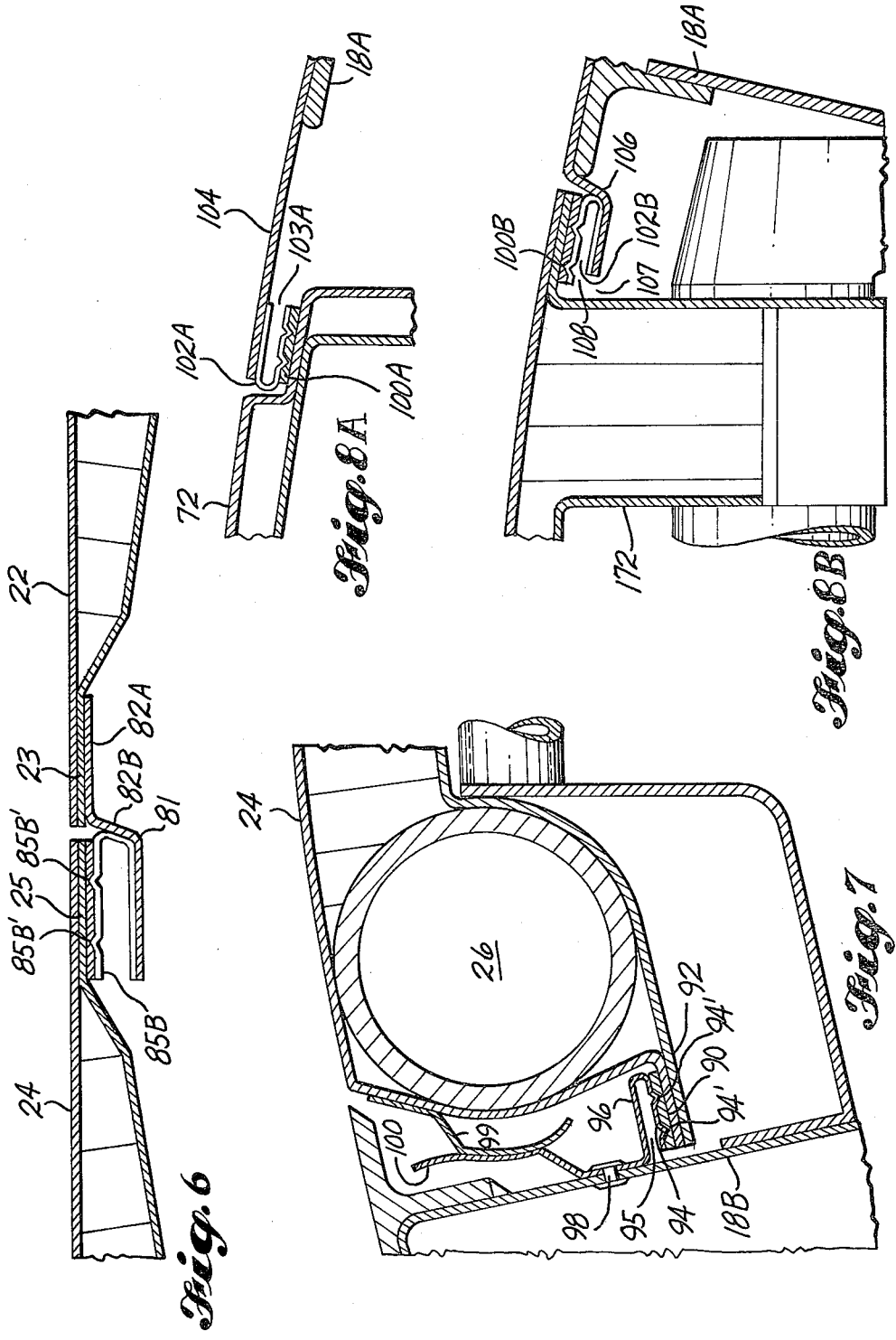

COMPRESSION-SEALED NACELLE INLET DOOR ASSEMBLY

Description

TECHNICAL FIELD

The present invention is directed toward a compression-sealed door assembly for use in efficiently controlling air flow through a gas turbine engine assembly installed in a supersonic jet aircraft.

BACKGROUND ART

It is well-known that the exposed frontal area of a jet aircraft generates a rapidly increasing drag penalty as the aircraft achieves supersonic flight. Because a significant portion of the exposed frontal area is often directly attributable to the inlet size of the gas turbine engine employed to power the jet aircraft, it is apparent that the inlet should be minimized to reduce the drag penalty generated during supersonic flight. A reduced gas turbine inlet can provide sufficient air flow at supersonic speeds due to the relatively high ram pressures generated by the aircraft. However, the same gas turbine inlet cannot provide adequate air flow during take-off and low speed flight due to the greatly reduced ram pressures generated during slow speed flight of the aircraft.

In an effort to solve the problem of providing sufficient air flow through a gas turbine inlet during subsonic and supersonic flight, it has been suggested that additional air flow passageways be constructed for selective use only during take-off and low speed flight operations. Preferably, the air passageways would be formed in the inlet portion of the engine nacelle assembly, thereby allowing additional air to enter the gas turbine inlet. In order to maintain the required pressure level in the inlet during supersonic flight, it would be necessary to close the air passageways to prevent air pressure leakage therethrough. At this point, it was suggested that door assemblies be mounted in the nacelle for selectively covering and uncovering the air passageways as required. During take-off and low speed flight, the door assemblies would be selectively moved to open positions, allowing additional air to flow through the air passageways and enter the gas turbine inlet. As the flight speed of the supersonic jet aircraft increased to a level wherein the ram pressure provided sufficient air flow through the relatively small gas turbine inlet, the door assemblies would be selectively moved to their closed positions. This would prevent the relatively highly pressurized air from escaping from the inlet through the air passageways. However, if excessive air pressure were to be generated within the gas turbine inlet, the door assemblies could be selectively moved to their open positions, thereby allowing the excessive air pressure to be vented from the inlet via the air passageways.

While such a system would appear to provide a means for controlling air flow pressure in a supersonic gas turbine inlet, known systems have proven generally unsatisfactory in preventing excessive propulsion system losses, especially during supersonic flight operations of the aircraft. Even though conventional door assemblies attempt to block air flow through the air passageways leading from the gas turbine inlet, a stream of air tends to leak past known door assemblies, decreasing the operating pressure in the inlet and significantly reducing the operating efficiency of the power plant during supersonic flight.

As will become clear, the present invention provides an improved system for controlling air flow through a gas turbine inlet during both subsonic and supersonic flight, while at the same time providing a unique, compression-sealed door assembly for preventing excessive leakage of inlet air from the gas turbine even during supersonic flight operations of the jet aircraft.

DESCRIPTION OF THE INVENTION

In a preferred embodiment of the present invention, separate door assemblies are positioned for selectively covering and uncovering a plurality of separate air passageways extending through a nacelle inlet in order to control air flow through the gas turbine inlet. Each door assembly preferably includes a pair of separate external doors pivotally mounted on opposite sides of an air passageway. Furthermore, each pair of doors includes overlapping end portions as well as side portions overlapping portions of the nacelle inlet located adjacent to the periphery of each air passageway.

A strip of spring steel or the like is preferably bonded to side portions of each door for contacting a strip of carbon bonded to confronting surface portions of the nacelle defining each air passageway. Furthermore, each pair of overlapping doors includes a door having a strip of spring steel or the like confronting a strip of carbon bonded to the remaining door. Preferably the strips of steel are formed of 0.015 inch thick spring steel having a substantially rectangular cross-section. However, spring steel of varying composition and configuration can be employed. Likewise, preferably 0.02 inch thick carbon is bonded to each sill portion of the nacelle confronting the strips of spring steel. However, the 0.02 inch thick carbon can be replaced with other materials having good sealing characteristics and compatible with the spring steel.

While the preferred embodiment employs U-shaped strips of spring steel bonded to each door and strips of carbon bonded to nacelle portions surrounding each air flow passageway, it is considered within the scope of the present invention to bond the strips of spring steel to the nacelle and the strips of carbon or the like to the doors.

Actuator means are provided for selectively pivoting each pair of doors toward one another until the U-shaped strips of steel are tightly compressed against confronting strips of carbon, thereby sealing the air flow passageways against air flow in either direction. The seal created between the steel and carbon strips is enhanced by the internal duct pressure also acting to expand the seals, thereby increasing the sealing pressure between the spring steel strips and their carbon sills.

Each door assembly also includes an interior door pivotally mounted for movement between an inwardly inclined position, a neutral position and an outwardly inclined position within the air flow passageway.

During take-off and slow speed flight, the air flow through the gas turbine inlet is usually inadequate to meet the needs of the engine. Therefore, the actuator means is selectively activated to pivot each pair of doors away from one another to open the radial air flow passageways into the nacelle inlet. The interior doors are also pivoted to their inwardly inclined positions to form chutes leading from the air passageways into an interior portion of the gas turbine engine assembly. As a result, additional air is directed through the air passageways and into the gas turbine inlet. As the jet aircraft increases in speed, the efficiency of the inlet opening increases, making the additional air unnecessary. The actuator means is then activated to pivot each pair of doors to their closed positions, with the interior doors also being pivoted to their neutral positions.

If excessive air pressure is generated within the gas turbine inlet, each pair of doors is again selectively opened by the actuator means. Furthermore, the interior doors are then selectively pivoted to their outwardly inclined positions, whereby the interior doors form chutes leading outwardly from the inlet. The excessive inlet air pressure is then dissipated through the air passageways and associated chutes. Once the inlet air pressure is sufficiently reduced, the doors are returned to their closed and neutral positions, respectively. Because of the compressive engagement between the U-shaped resilient strips and the carbon sills, a substantially air-tight seal is generated between each pair of doors and the nacelle inlet when the doors reach their closed positions.

BRIEF DESCRIPTION OF THE DRAWINGS

The present invention can be best understood with reference to the attached drawings, wherein:

FIGS. 1A–D show schematic cross-sectional views of a compression-sealed door assembly constructed in accordance with a preferred embodiment of the present invention, wherein FIG. 1A illustrates the position of the doors when in the take-off mode, FIG. 1B the Bypass Mode, FIG. 1C the Trim Mode and FIG. 1D the Cruise Mode; respectively;

FIG. 2 shows a side view of a jet mounted gas turbine engine assembly including a plurality of the compression-sealed door assemblies of FIG. 1;

FIG. 3 shows a cross-sectional view through the engine assembly of FIG. 2, taken along plane A—A;

FIG. 4A shows a perspective view of the compression-sealed door assembly of FIG. 1D;

FIG. 4B shows a perspective view of the compression-sealed door assembly of FIG. 1B;

FIG. 6 shows a blown-up view of a portion of the compression-sealed door assembly taken through section C—C in FIG. 5;

FIG. 7 shows a blown-up view of a portion of the compression-sealed door assembly taken through section D—D in FIG. 5;

FIG. 8A shows a blown-up view of a forward portion of the trim door assembly taken through plane E—E in FIG. 1A; and FIG. 8B shows a blown-up view of an aft portion of the trim door assembly taken through plane F—F in FIG. 1A.

BEST MODE FOR CARRYING OUT THE PRESENT INVENTION

Figure 5:
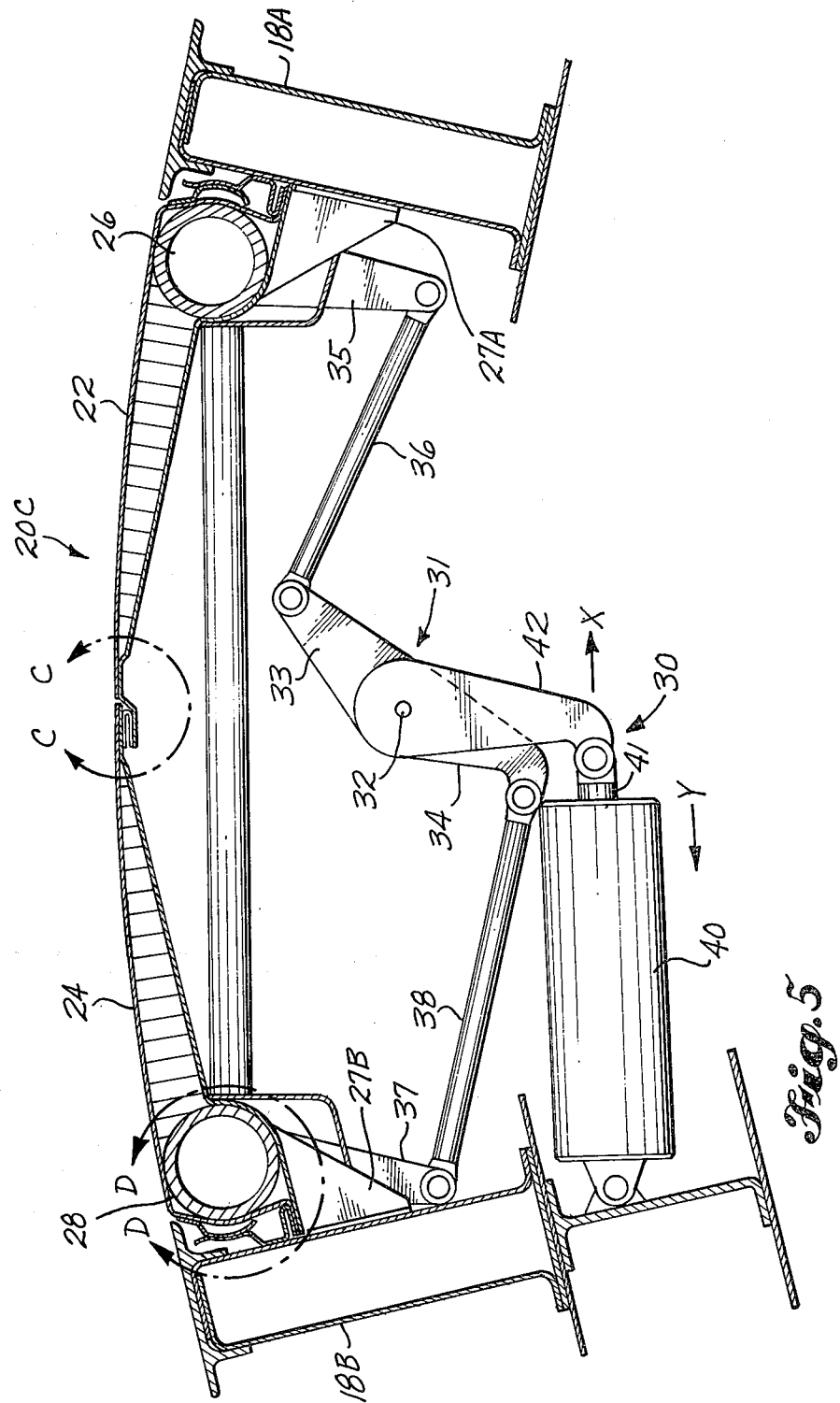
FIG. 5 shows a cross-sectional view through the compression-sealed door assembly of FIG. 1D, taken along plane B—B.

In the preferred embodiment of the present invention, similar reference numerals indicate similar apparatus. As shown in FIG. 2, a nacelle assembly 10 is suspended beneath a wing section 12 of a jet aircraft, not shown, via a conventional support strut 14. Nacelle assembly 10 includes an inlet portion 15A, an engine cowling portion 15B and a nozzle portion 15C, respectively. A gas turbine engine, not shown, is mounted within engine cowling portion 15B and faces toward inlet portion 15A in conventional manner.

Inlet portion 15A includes a pluarlity of circumferentially spaced forward longerons 18 each extending substantially parallel to a longitudinal axis through inlet portion 15A, as best shown in FIG. 3. Because the forward longerons 18 are circumferentially spaced from one another, they define radial openings therebetween. The radial openings extending through inlet portion 15A define air flow passageways between an interior portion of engine nacelle 10 and the surrounding atmosphere.

As shown in FIG. 3, a plurality of separate compression-sealed door assemblies 20A, 20B, 20C, etc., span the openings formed between circumferentially spaced longerons 18 for the express purpose of controlling air flow entering or leaving inlet portion 15A in a manner which will become clear. Compression-sealed door assemblies 20A, B, etc., are substantially similar to one another, with door assembly 20A shown in a bypass position and door assembly 20B in a take-off position in FIG. 3 for purposes of explanation only. Because the door assemblies 20A, B, C, etc., are substantially similar in structure to one another, a description of any particular door assembly is considered sufficient to provide a proper understanding of the remaining door assemblies.

A typical compression-sealed door assembly 20 is shown fully closed in FIG. 4A and fully open in FIG. 4B.

Compression-sealed door assembly 20 includes a pair of separate external doors 22 and 24 which are pivotable toward or away from one another. As shown in FIG. 5, external door 22 preferably includes a substantially cylindrically-shaped end portion 26 rotatably mounted in a support bracket assembly 27A extending from an adjacently disposed longeron 18A. In a similar manner, external door 24 also includes a substantially cylindrically-shaped end portion 28 rotatably mounted in a support bracket assembly 27B extending from an adjacently disposed longeron 18B.

While each external door 22 and 24 is preferably of substantially rectangular configuration, it is considered within the scope of the present invention to employ external doors of almost any geometrical configuration. Furthermore, while a pair of doors 22 and 24 are preferably employed for reasons which will become clear, it is also considered within the scope of the present invention to mount a single external door between each pair of adjacently disposed and circumferentially spaced longerons 18. It is only necessary that the total area of the doors remain substantially constant. When in their fully closed positions as shown in FIG. 5, external doors 22 and 24 span the entire circumferential gap between longerons 18a and 18b. Alternatively, doors 22 and 24 generally extend outwardly from inlet portion 15A in a direction substantially parallel to one another when in their fully open positions as shown in FIG. 4B. As will become clear, doors 22 and 24 effectively control the flow of air through inlet portion 15A by blocking the opening or gap between longerons 18a and 18b when fully closed, while allowing maximum air flow between longerons 18a and 18b when in their open position.

An actuator assembly generally indicated at 30 is employed for simultaneously pivoting external doors 22 and 24 between their fully closed and fully open positions, respectively. Actuator assembly 30 includes a crank 31 mounted on a shaft 32 for joint rotation therewith, wherein shaft 32 preferably extends parallel to longerons 18a and 18b. Preferably, shaft 32 is mounted on a pair of supports, not shown, which traverse the gap between longerons 18a and 18b, respectively. Crank 31 includes arm portions 33 and 34, with arm portion 33 attached to the cylindrical end portion 26 of door 22 via a pair of intermediate links 35 and 36 pivotally attached end-to-end therebetween. In a like manner, arm portion 34 is attached to the cylindrical end 28 of door 24 via a pair of intermediate links 37 and 38 pivotally attached end-to-end therebetween. In particular, link 35 is rigidly attached at one end to cylindrical portion 26 of door 22, and is pivotally attached at an opposite end to link 36. Link 36, in turn, includes an opposite end pivotally attached to crank arm portion 33. Likewise, link 37 is rigidly attached at one end to cylindrical portion 28 of door 24 and is pivotally attached at an opposite end to link 38. Finally, link 38 includes a further, opposite end pivotally attached to crank arm portion 34 at a location remote from link 36.

A power source, such as the hydraulic actuator schematically indicated at 40, is conveniently attached to longeron 18B and includes a slidable piston rod 41 pivotally attached to a crank member 42 which, in turn, is attached at an opposite end to shaft 32 for joint rotational movement. Upon selective actuation of hydraulic actuator 40, piston rod 41 is disposed to move generally toward longeron 18A, as indicated by the direction of arrow X. This movement causes attached crank member 42 to pivot in a counter-clockwise direction about an axis coinciding with shaft 32. Because shaft 32 is attached to crank 42 for joint movement, the counter-clockwise pivoting movement of crank 42 causes shaft 32 to also rotate in a counter-clockwise direction. Because crank 31 is mounted for joint movement with shaft 32, counter-clockwise rotation of shaft 32 initiates counter-clockwise rotation of crank 31. This, in turn, initiates movement of attached intermediate links 35-38, causing doors 22 and 24 to simultaneously pivot away from one another to their fully open positions of FIG. 4B. Alternatively, actuator 40 can be actuated such that piston rod 41 slides toward longeron 18B as indicated by the direction of arrow Y, thereby causing clockwise rotation of crank 42, shaft 32 and crank 31. This, in turn, initiates movement of the attached intermediate links in an opposite direction, thereby pivoting doors 22 and 24 toward one another until reaching their fully closed positions of FIG. 5.

A separate crank and link assembly is preferably positioned between adjacently disposed longerons 18 for actuating each door assembly 20A, 20B, 20C, etc. While a separate hydraulic actuator 40 may be employed for driving each linkage, it is also considered within the scope of the present invention to have each hydraulic actuator 40 drive a plurality of separate linkages through one or more connector rings which may extend between a plurality of the cranks 31 and associated piston rods 41. Likewise, the actuators 40 need not be hydraulically powered, rather, actuators 40 can be driven by any suitable power source such as electromagnetic energy. It is only necessary to provide a power source capable of rotating at least one crank 31 and its associated linkage, thereby causing at least one pair of external doors 22 and 24 to simultaneously pivot toward or away from one another as required to cover or uncover the opening defined between adjacent longerons 18.

As clearly shown in FIGS. 1A-D, each door assembly 20 further includes an interior door 50 having a forward or upstream end portion 52 pivotally mounted on a shaft 54 extending between a pair of adjacently disposed longerons 18. Each interior door 50 preferably has a substantially rectangular configuration and spans the opening or gap formed between the spaced longerons 18. As shown in FIGS. 1A-D, an actuator assembly 56 extends from a fixed support 58 attached to a beam extending between longerons 18 and a portion of interior door 50 for selectively pivoting door 50 about shaft 54. Actuator assembly 56 provides the motive force for selectively pivoting interior door 50 either clockwise or counter-clockwise about shaft 54. In particular, it is noted that interior door 50 extends substantially parallel to closed doors 22, 24 when interior door 50 is in an initial position as shown in FIGS. 1C and 1D.

If additional air is needed within the inlet portion 15A of nacelle assembly 10 for proper operation of the gas turbine, as during take-off and climb operations of the jet aircraft, each door assembly 20 is moved to its respective open position, wherein each pair of doors 22 and 24 are pivoted so as to extend substantially parallel to one another. In addition, each internal door 50 is pivoted about its respective shaft 54 until it is inclined toward an interior portion of nacelle inlet 15A. This operation of doors 22, 24 and 50 creates a plurality of separate, smooth air chutes leading through the inlet wall, allowing additional ambient air to flow into nacelle inlet 15A through the chutes in a direction generally indicated by arrow T in FIG. 1A. Alternatively, conditions may occur during flight which give rise to excessive air pressure levels within nacelle inlet 15A. In order to reduce the air pressure within inlet 15A, external doors 22 and 24 may be opened and internal doors 50 rotated about their respective shafts 54 until they extend outwardly through the open doors 22, 24 as shown in FIG. 1B by arrow H. This position corresponds to the bypass mode wherein smooth air chutes direct air outwardly through the wall of inlet 15A in order to reduce the air pressure entering the gas turbine engine.

In order to provide a smooth flow of additional air into nacelle inlet 15A during take-off and climb a channel defining member 60 is mounted within each opening such that an upstream end 62 is pivotally attached to a support wall of the nacelle inlet and a downstream portion of member 60 is attached to interior door 50 via a pivotally attached link 64. Each interior door 50 has its own channel defining member 60 arranged to define a smooth air flow channel through the opening when each interior door 50 is pivoted to its inwardly inclined position.

Because temporary, minor adjustments in the internal inlet pressure are often necessary to provide efficient operation of the gas turbine engine during changing flight conditions, separate trim door assemblies 70A, 70B, 70C, etc., are pivotally mounted downstream of each respective door assembly 20A, 20B, 20C, etc. Because of the similar nature of the separate trim door assemblies, a description of any trim door assembly 70 is believed sufficient to provide a proper understanding of the remaining trim door assemblies. Trim door assembly 70 includes a door 72 having a generally rectangular configuration mounted for joint rotation with a shaft 74 spanning the gap between adjacent longerons 18. An upstream end portion 76 of each trim door 72 selectively confronts a downstream portion of each pair of closed doors 22 and 24 in a sealed manner to be described. Each trim door 72 is caused to pivot about a transverse axis defined by its respective shaft 74 upon selective actuation of an actuator 78 extending between the trim door 72 and a stationary bracket attached to nacelle inlet 15A. In order to quickly create relatively small air chutes through the nacelle inlet 15A, it is only necessary for actuators 78 to pivot the forward end portion 76 of each trim door 72 in an inward direction away from the closed doors 22, 24 as shown in FIGS. 1B and 1C. This creates a plurality of separate air chutes between an interior portion of the nacelle inlet 15A and the surrounding ambient atmosphere. If these passageways cannot expel a sufficient amount of air from the interior portion of inlet 15A, door assemblies 20A, 20B, 20C, etc., can be actuated as required. Preferably, trim doors 72 provide a minimum drag discharge of gas turbine inlet air for engine trimming, while allowing a bypass mode discharge of approximately 26% of maximum requirement, when fully open.

As shown in FIGS. 5 and 6, a bracket 81 of substantially S shaped configuration is attached to a peripheral edge portion 23 of door 22. Bracket 81 includes a first end portion 82A confronting and attached to a surface of peripheral edge portion 23 facing the interior portion of inlet 15A. Bracket 81 further includes an intermediate portion 82B attached to first end portion 82A and inclined at an angle thereto, such that intermediate portion 82B projects into the opening formed between longerons 18A and 18B. Finally, bracket 81 includes a second end portion 82C which extends from intermediate portion 82B in a direction substantially parallel to a peripheral edge portion 25 of the remaining door 24. Second end portion 82C overlaps and is spaced from peripheral edge portion 25 when doors 22 and 24 are in their fully closed positions. While bracket 81 has been shown as being attached to an interior surface of door 22, it is considered within the scope of the present invention to attach bracket 81 to the peripheral portion 25 of door 24 such that the second end portion 82C overlaps and is spaced from the peripheral edge of door 22.

A substantially U-shaped strip 84 preferably constructed of spring steel includes an arm portion 85A which is bonded to the second end portion 82C of bracket 81 along a surface confronting the peripheral edge 25 of door 24. Strip 84 also includes an oppositely disposed arm portion 85B which confronts a strip of carbon 86 bonded to peripheral edge 25 along a surface confronting end portion 82C of bracket 81. The improved sealing capability of strip 84 is the result of three factors. First the U-shaped strip 84 is carefully constructed such that when strip 84 is in a free-standing or unloaded condition as it would be with doors 22, 24 in the position shown in FIG. 4B, the spacing between arms 85A and 85B is greater than the normal spacing between peripheral portion 25 and the second end portion 82C when the doors are in their fully closed positions as shown in FIG. 4A. This means that strip 84 must be compressed for doors 22 and 24 to reach their fully closed positions as shown in FIG. 6. Because strip 84 is formed of spring steel, the compressive forces generated on strip 84 by doors 22 and 24 are resisted by a restoring force inherently present in the U-shaped strip. Second, arm portion 85B of strip 84 carries two ribs 85B′ which, as shown in FIG. 6, will slightly deform carbon strip 86 when doors 22,24 are fully closed. These ribs thus form a sealing arrangement commonly known as a labyrinth seal which still further enhances seal integrity. Finally, as may be seen in FIGS. 5 and 6, U-shaped strip 84 is oriented so that the spaced apart arms 85A, 85B open into the interior portion of inlet 15A. Pressure created by the flow of air through the interior of inlet 15A thus acts to increase the sealing pressure applied by strip 84. As a result, strip 84 presses tightly against carbon strip 86, creating a fluid-tight seal between the peripheral edge portions 23 and 25 of doors 22 and 24.

In order to provide leak-proof seals between the forward or upstream end portions 27 and 29 of doors 22 and 24, respectively, and an adjacent surface 87 of inlet 15A which extends between doors 22 and 24, a substantially U-shaped strip of compression steel is preferably bonded to lower surfaces of each upstream end 27 and 29 which overlap and confront surface 87. In addition, a strip of carbon is bonded to surface 87 such that each U-shaped strip of compression steel abuts and is compressed against surface 87 as doors 22 and 24 pivot toward their fully closed positions. Alternatively, it is considered within the scope of the present invention to attach the U-shaped strips of compression steel to surface 87 and to attach a carbon strip to forward edge portions 27 and 29, respectively. In either case, the U-shaped strips are compressed between confronting surface portions of inlet 15A and doors 22 and 24 to create a fluid-tight sealing effect therebetween.

A single U-shaped strip 84 may surround the entire periphery of door 22, with door 24 having a pair of U-shaped strips attached to upstream and downstream peripheral edge portions, respectively. This ensures that a fluid-tight seal is generated between doors 22 and 24, between doors 22, 24 and surface 87 of inlet 15A and between doors 22, 24 and forward surface portion 76 of trim door 72.

Alternatively, separate strips of compression steel may be each bonded to door 22 in place of the single strip. In a yet further embodiment, the strip of compression steel compressed between downstream edge portions of doors 22, 24 and trim door 72 is eliminated, with doors 22 and 24 directly contacting the forward end surface 76 of trim door 72.

As shown in FIG. 7, a strip 90 of carbon is attached to a bracket 92, itself attached to cylindrically-shaped portion 26 of door 24. Confronting strip 90 is an arm portion 94 of a substantially U-shaped strip 96 of compression or spring steel. Strip 96 is conveniently attached to longeron 18B via an attachment pin 98. As door 24 is pivoted toward its fully closed position, bracket 92 pivots in a clockwise direction about an axis through cylindrical portion 26 toward U-shaped strip 96. Strip 96 is carefully constructed such that arm portion 94 makes contact with the strip of carbon 90 before arm 24 reaches the fully closed position. This means that U-shaped strip 96 is compressed by bracket 92 as arm 24 finally reaches the fully closed position. As before, the sealing capabilities of strip 96 are enhanced by ribs 94′ and by internal inlet air pressure admitted into the inside 95 of U-shaped strip 96 by means of a gap 93 between longeron 18B and the end of bracket 92. As a result, a leak proof seal is created between arm portion 94 of strip 96 and the strip of carbon 90 when door 24 is fully closed. A further, elongated strip 99 of compression steel is also attached to cylindrically-shaped portion 26. Strip 99 confronts and abuts an elongated end portion 100 of the U-shaped strip 96 remotely positioned from arm portion 94 when door 24 is in its fully closed position, thereby increasing the overall sealing affect between door 24 and longeron 18B. A similar U-shaped strip is also attached to longeron 18A and forms a compression-seal with a strip of carbon mounted for movement with door 22.

As shown in FIGS. 8A and 8B, each trim door 72 includes either a carbon strip 100A or a carbon strip 100B, with strip 100A attached to an upper surface of trim door 72 extending upstream of pivot shaft 74 as shown in FIG. 8A. Likewise, carbon strip 100B is attached to a lower surface portion of trim door 72 extending downstream from pivot shaft 74. A U-shaped strip 102A of compression steel is attached to a bracket 104 extending from longeron 18A, such that compression strip 102A is compressed against carbon strip 100A as trim door 72 pivots to its fully closed position. Once again, strip 102A carries ribs 102A' and opens at 103A to the inside of inlet 15A. Likewise, a U-shaped strip 102B of compression steel carrying ribs 102B' is attached to a substantially S-shaped bracket 106, itself attached to longeron 18A, such that compression strip 102B is compressed against carbon strip 100B as trim door 72 pivots to its fully closed position. Again, inlet air pressure acts through gap 107 between bracket 106 and door 72 to increase sealing pressure in opening 108 of strip 102B. A similar sealing arrangement is also provided between an opposite edge of each trim door 72 and longeron 18B.

In their closed positions, all strips of compression steel bonded to doors 22 and 24 are held against their respective carbon strips by actuator pressure, compressing the spring steel seals against the carbon strip sills. Internal duct pressure within the gas turbine inlet acts to expand the spring steel strips, thereby increasing the sealing pressure between the doors.

Whether a U-shaped spring steel strip is bonded to the periphery 23 of door 22 or the periphery 25 of door 24 is entirely a design choice, providing only that the remaining door includes a carbon strip for engaging strip 84. Likewise, the U-shaped strips 84 can be mounted on the nacelle inlet as well as the trim door rather than on the forward and rearward portions of doors 22, 24. In such an arrangement, carbon strips would be bonded to confronting door surfaces for contacting the steel strips.

While spring steel of 0.015 inch thickness is preferably employed in the strips 84, it is considered within the scope of the present invention to employ U-shaped strips of varying composition, or to replace the steel strips with strips of any substantially similar material capable of compression loading. Likewise, while 0.02 inch thick carbon is preferred for the carbon strips, it is within the scope of the present invention to substitute carbon strips of varying composition, or to replace the carbon strips with strips of any substantially similar material.

The scope of protection of the present invention is not intended to be limited to the above discussed embodiments, rather, the scope of protection is only intended to be limited by the claims following hereafter.

What is claimed is:

1. A compression-sealed door assembly for controlling air pressure within a supersonic jet nacelle inlet having at least one secondary air flow passageway formed through a wall portion of said nacelle inlet, and comprising:

door means mounted for pivotal movement with respect to said nacelle inlet for selective movement between a closed position wherein said door means span and thereby close said secondary air flow passageway and an open position wherein air smoothly flows through said secondary air flow passageway;

sealing means arranged between a surface portion of said door means and a confronting surface portion of said nacelle inlet for providing a fluid-tight seal therebetween when said door means assumes said closed position;

said sealing means comprising a substantially U-shaped strip of resilient material attached to one of said confronting surface portions at a location where the distance between said confronting surface portions is less than the distance between the arms of said U-shaped strip in its unloaded condition, and the space between said arms being in fluid communication with the interior of said inlet;

whereby when said door means assume a closed position, both the restoring force of the resilient material and fluid pressure from within the inlet press the seal into firm sealing contact between the door means and the inlet;

said sealing means further comprising a strip of carbon attached to the other of said confronting surface portions and wherein the one of said arms of said U-shaped strip which confronts said carbon strip carries at least two ribs protruding outwardly therefrom, so that when said door means is in said closed position, said at least two ribs contact a surface of said carbon strip and form a labyrinth seal therewith.

2. A compression-sealed door assembly according to claim 1, wherein a plurality of separate door means are circumferentially spaced from one another about the nacelle inlet, with each door means spanning a separate air flow passageway extending through said nacelle inlet when said door means reaches a closed position.

3. A compression-sealed door assembly according to claim 2, wherein actuator means are mounted on said nacelle inlet for selectively pivoting said door means between said open and closed positions, respectively.

4. A compression-sealed door assembly according to claim 2, wherein each door means comprises a pair of external door members pivotally mounted on opposite sides of each said air flow passageway, such that each pair of external door members are positioned end-to-end when reaching their respective closed positions.

5. A compression-sealed door assembly according to claim 4, further comprising sealing means between the two door members of each said pair, said sealing means comprising a substantially U-shaped strip of resilient material compressed between a peripheral edge portion of one of said external door members and a bracket attached to and extending from the other external door member of said pair, the distance between the arms of said U-shaped strip in its unloaded condition being greater than the distance between said edge portion and said bracket when said door members assume their closed position, and the space between said arms being in fluid communication with the interior of said inlet.

6. A compression-sealed door assembly according to claim 5, wherein said bracket has a substantially S-shaped configuration, and includes a first end portion attached to said second external door member and a second end portion extending substantially parallel to and spaced from the peripheral edge portion of said first external door member.

7. A compression-sealed door assembly according to claim 6, wherein a strip of carbon is fixedly attached to said edge portion of said first external door and confronts the second end portion of said bracket, one of said arms of said U-shaped resilient strip being fixedly attached to said second end portion and a second arm confronts said strip of carbon.

8. A compression-sealed door assembly according to claim 2, wherein a separate trim door assembly is pivotally mounted in each air flow passageway at a location immediately downstream from one of said door means;

each trim door assembly including an upstream end portion confronting a downstream end portion of said respective door means, and resiliently compressible sealing means arranged between confronting end portions of each door means and an adjacently disposed trim door assembly for preventing air leaking therebetween.

9. A compression-sealed door assembly according to claim 4, wherein each door means further comprises an interior door assembly pivotally mounted in a respective air flow passageway, said interior door assembly including an interior door and an actuator means for selectively pivoting said interior door between an open pair of external door members to provide a smooth air chute for expelling excessive air from said nacelle inlet; and for selectively pivoting said interior door toward an interior portion of said nacelle inlet to provide a smooth chute for introducing additional air into said nacelle inlet.

10. A compression-sealed door assembly according to claim 5, wherein each substantially U-shaped strip is formed of spring steel.

11. A compression-sealed door assembly according to claim 10, wherein each strip is formed of spring steel having a substantially 0.015 inch thickness.

* * * * *